United States Patent
Zhang et al.

(10) Patent No.: US 12,360,758 B2
(45) Date of Patent: Jul. 15, 2025

(54) METHODS AND APPARATUS TO PERFORM AN ENHANCED S3 PROTOCOL TO UPDATE FIRMWARE WITH A BOOT SCRIPT UPDATE

(71) Applicant: Intel Corporation, Santa Clara, CA (US)

(72) Inventors: Di Zhang, Shanghai (CN); Zhuangzhi Li, Shanghai (CN); Zhi Jin, Shanghai (CN); Fei Li, Shanghai (CN); Xinwu Liu, Shanghai (CN); Bin Yang, Shanghai (CN); Brett Peng Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 18/040,146

(22) PCT Filed: Aug. 21, 2020

(86) PCT No.: PCT/CN2020/110437
§ 371 (c)(1),
(2) Date: Jan. 31, 2023

(87) PCT Pub. No.: WO2022/036670
PCT Pub. Date: Feb. 24, 2022

(65) Prior Publication Data
US 2023/0305833 A1 Sep. 28, 2023

(51) Int. Cl.
*G06F 8/65* (2018.01)
*G06F 9/4401* (2018.01)
*G06F 9/48* (2006.01)

(52) U.S. Cl.
CPC ............. *G06F 8/65* (2013.01); *G06F 9/4418* (2013.01); *G06F 9/4812* (2013.01)

(58) Field of Classification Search
None
See application file for complete search history.

(56) References Cited

U.S. PATENT DOCUMENTS

| | | | | |
|---|---|---|---|---|
| 7,100,037 B2 * | 8/2006 | Cooper | ................. | G06F 9/4418 713/1 |
| 8,082,439 B2 * | 12/2011 | Desselle | .................. | G06F 8/65 713/1 |

(Continued)

FOREIGN PATENT DOCUMENTS

| CN | 103207797 A | 7/2013 |
|---|---|---|
| WO | 2018022268 A1 | 2/2018 |

OTHER PUBLICATIONS

Vishal, "BIOS Support for Intel (R) 2014(Broadwell) Platform", 2014, Nirma University (Year: 2014).*

(Continued)

*Primary Examiner* — Hossain M Morshed
(74) *Attorney, Agent, or Firm* — HANLEY, FLIGHT & ZIMMERMAN, LLC

(57) ABSTRACT

Methods, apparatus, systems, and articles of manufacture perform an enhanced S3 protocol to update firmware with a Boot Script update are disclosed. An example apparatus includes a management agent to store a firmware update into memory; and request an operating system (OS) to enter into an S3 sleep state; the OS to, in response to the request from the management agent, enter into the S3 sleep state and trigger an interrupt; and a basic input/output system (BIOS) to, in response to the interrupt from the OS update a Boot Script according to the firmware update; and wake up the OS with a wake vector.

20 Claims, 8 Drawing Sheets

(56) References Cited

U.S. PATENT DOCUMENTS

| | | | | |
|---|---|---|---|---|
| 8,214,654 | B1* | 7/2012 | Wyatt | H04L 63/0478 |
| | | | | 713/191 |
| 8,601,175 | B1* | 12/2013 | Todd | G06F 16/25 |
| | | | | 714/48 |
| 2004/0015941 | A1 | 1/2004 | Sekine | |
| 2005/0223291 | A1* | 10/2005 | Zimmer | G06F 11/1433 |
| | | | | 714/34 |
| 2006/0143600 | A1* | 6/2006 | Cottrell | G06F 21/572 |
| | | | | 717/168 |
| 2014/0149644 | A1* | 5/2014 | Park | G06F 8/654 |
| | | | | 713/100 |
| 2017/0010875 | A1* | 1/2017 | Martinez | G06F 21/60 |
| 2017/0242685 | A1* | 8/2017 | Sperlich | B05B 5/0533 |
| 2017/0293451 | A1* | 10/2017 | Pan | G06F 3/061 |
| 2018/0285569 | A1* | 10/2018 | Spanjers | G06F 9/4401 |
| 2019/0042279 | A1* | 2/2019 | Rothman | G06F 1/3287 |
| 2019/0243637 | A1* | 8/2019 | Nachimuthu | G06F 8/656 |
| 2020/0320200 | A1* | 10/2020 | Singh | G06F 8/65 |
| 2021/0034376 | A1* | 2/2021 | Kalla | G06F 9/4416 |
| 2023/0305834 | A1* | 9/2023 | Kumar | G06F 9/4418 |

OTHER PUBLICATIONS

International Searching Authority, "International Preliminary Report on Patentability," issued in connection with Application No. PCT/CN2020/110437, mailed Mar. 2, 2023, 5 pages.

International Searching Authority, "Search Report and Written Opinion," issued in connection with Application No. PCT/CN2020/110437, mailed May 21, 2021, 8 pages.

* cited by examiner

METHODS AND APPARATUS TO PERFORM AN ENHANCED S3 PROTOCOL TO UPDATE FIRMWARE WITH A BOOT SCRIPT UPDATE

RELATED APPLICATION(S)

This patent arises from the national stage of International Application No. PCT/CN2020/110437, which was filed on Aug. 21, 2020. International Application No. PCT/CN2020/110437 is hereby incorporated herein by reference in its entirety. Priority to International Application No. PCT/CN2020/110437 is hereby claimed.

BACKGROUND

Electronic devices (e.g., computing devices, laptops, server platforms, etc.) are capable of operating in a sleep or low power mode. Such electronic devices may perform power management tasks corresponding to low power modes. Some electronic devices are capable of operating in different sleeping states (e.g., S1, S2, S3, S4, etc.). As opposed to a complete shutdown, a sleep state retains the memory state of the electronic device so that a computer can conserve resources but wake back up quickly without the full reboot of a complete shutdown. In a S3 state, a processor of the electronic device is off and some hardware on the motherboard may also be off. During the S3 state, the central processing unit (CPU) and system cache context is lost. Control starts from the processor's reset vector after a wake event to wake up from the S3 state.

Figure 1:
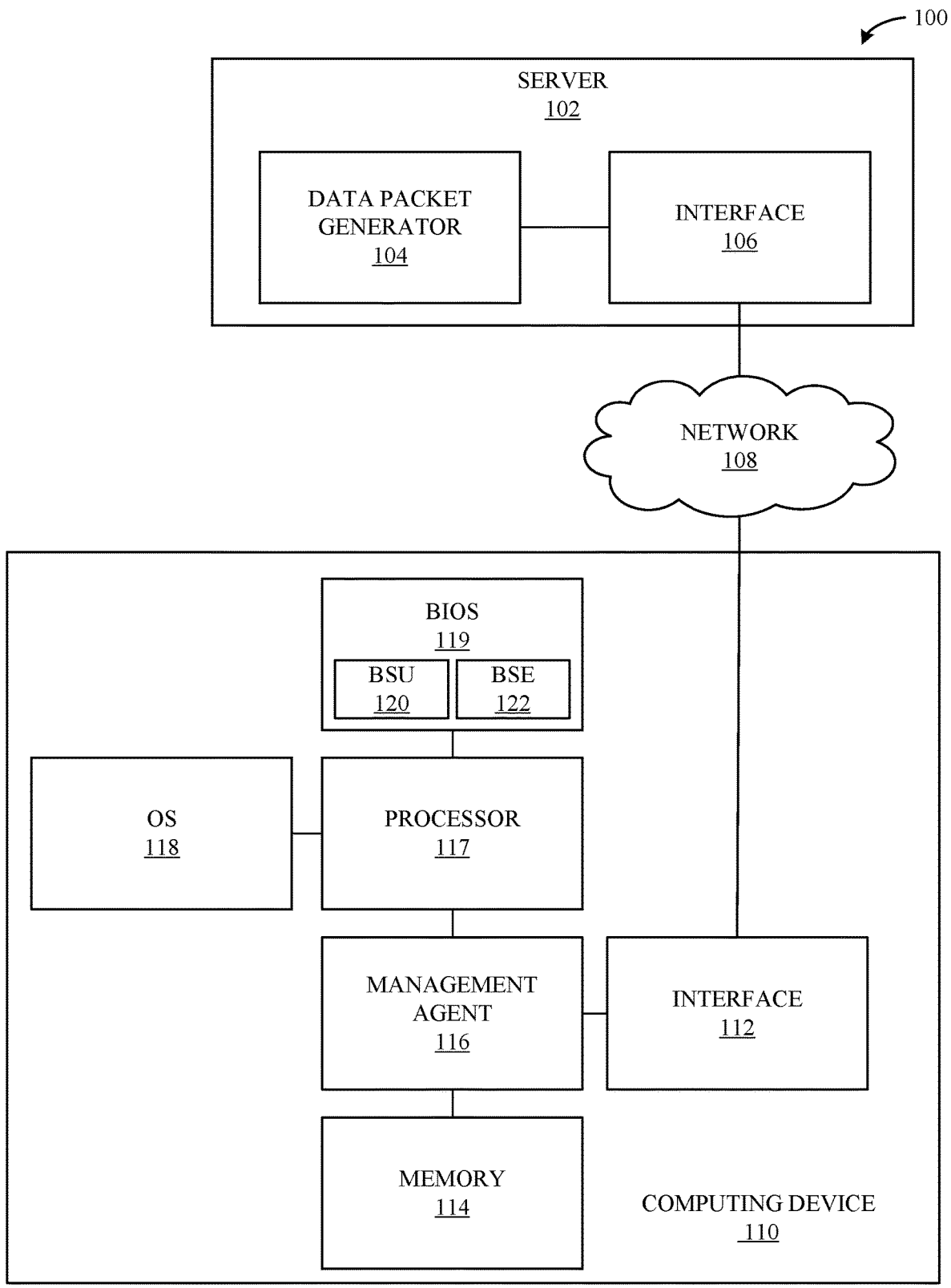
FIG. 1 illustrates an example environment for facilitating a firmware update using an enhanced S3 protocol in accordance with examples of this disclosure.

The figures are not to scale. In general, the same reference numbers will be used throughout the drawing(s) and accompanying written description to refer to the same or like parts. As used herein, connection references (e.g., attached, coupled, connected, and joined) are to be construed in light of the specification and, when pertinent, the surrounding claim language. Construction of connection references in the present application shall be consistent with the claim language and the context of the specification which describes the purpose for which various elements are connected. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some entities (e.g., cloud service providers) provide services (e.g., compute-as-a-service (CaaS)) to computing devices of users (e.g., computers, laptops, servers, virtual machines, etc.). Initially, the entity may provide (e.g., deploy) software, instructions, commands, etc., that may be implemented at the computing device of a user. However, as the entity generates updated software, instructions, patches, etc., the entity may deploy updates to the computing devices to update the computing system.

Traditionally, when an update from an entity includes or is based on a firmware update (e.g., updating the configuration of firmware at the computing device), a computing device performs a full reboot or a warm reboot to install the firmware update. During a full reboot, the operating system of the computing device shuts down and restarts all the processes and/or components of the computing device (e.g., including hardware drivers, kernels etc.) by interacting with the Basic Input/Output System (BIOS). The BIOS is firmware that performs hardware initialization during power up and/or booting the computing device. The BIOS is implemented with a Boot Script that corresponds to operation of the firmware of the BIOS. Updating the Boot Script updates the firmware of the BIOS. A warm reboot (also referred to as a warm reset a soft reset, or a soft reboot) includes closing current programs, including the operating system, and reinitiating a boot sequence until the operating system and all startup programs are reloaded. Because the example operating system is operating in an S3 state and memory is not cleared during a warm boot, when the operating system is reloaded, the example operating system continues operation where it left off based on a wake up vector that lets the operating system continue from where it left off before the S3 event. However, a warm reboot resets and restarts all components of the BIOS, which corresponds to downtime.

Although firmware updates may be vital to the performance and/or security of the computing device, a full boot or a warm reboot causes the computing device to be inoperable and/or unusable for one or more minutes. Such disruptions are undesirable. In some examples, such disruptions of service may violate a contract corresponding to a percentage of "ON" time and/or memory requirements. Additionally, a cloud service provider may require that computing devices (e.g., servers, virtual machines, etc.) keep memory intact. However, traditional firmware-based reboots may destroy the memory contents in violation of the requirement from the cloud service provider. Accordingly, to comply with the cloud server provider requirements, traditional firmware updating techniques include migrating workload and/or other information from the computing device to other nodes in a network of servers to be temporarily stored in the memory of the other nodes until the computing device reboots and can reload the remotely stored data. Accordingly, such traditional firmware updates are undesirable due to the time and resource consumption required to perform such traditional firmware updates.

Examples disclosed herein eliminate the need of a traditional full or warm reboot to perform a firmware update at a computing device, thereby reducing the downtime and computing resources associated with traditional firmware updates. Examples disclosed herein eliminate the traditional reboot by leveraging the S3 infrastructure of a computing system established in the operating systems (OS) (e.g., Windows, Linux, etc.). As used herein, S3 is a sleep state or power state of a computing device. Sleep states may include an S0 state (e.g., an awake state), S1 state (e.g., a sleep state where the CPU is stopped and your computer in standby mode), S2 state (e.g., the CPU is stopped and the computer is in standby mode and the CPU context and contents of the system cache are lost due to power loss of the processor), S3 state (e.g., data or context is saved in RAM and hard drives, fans, etc. are shut down), S4 state (e.g., data or context is saved to disk, also known as hibernate), and S5 state (e.g., complete shutdown power state).

Examples disclosed herein trigger an enhanced S3 protocol, which the OS interprets or detects as an S3 protocol (e.g., the OS 'thinks' that a S3 protocol is being implemented). In this manner, the OS pauses the drivers, keeps the memory intact, keeps the stack pointers intact (e.g., by storing in memory), etc. While in the OS interprets the enhanced S3 protocol as if the S3 protocol is being performed, examples disclosed herein perform an enhanced S3 protocol including the BIOS immediately waking up upon entering the S3 state and using a Boot Script updater to update firmware. Examples disclosed herein include a server that generates a Boot Script update capsule to deploy to the computing device, so that the Boot Script updater can update the Boot Script currently running on the BIOS of computing device. Because the Boot Script is the instructions performed by the firmware-based BIOS, updating the Boot Script corresponds to updating the firmware of the BIOS. Accordingly, examples disclosed herein update the firmware of the BIOS by updating the Boot Script while the OS is in the S3 state, without performing a full reboot or a warm reset.

FIG. 1 illustrates an environment 100 to deploy and implement a firmware update at an example computing device 110 without performing a full reboot or a warm reboot. The example environment 100 includes an example server 102, an example network 108, and the example computing device 110. The example server 102 includes an example data packet generator 104 and an example interface 106. The example computing device 110 includes an example interface 112, an example memory 114, an example management agent 116, an example processor 117 in communication with an example operating system (OS) 118, and an example BIOS 119 including an example Boot Script updater (BSU) 120 and an example Boot Script executor (BSE) 122.

The example server 102 of FIG. 1 is a computing device that deploys updates (e.g., software updates, firmware updates, etc.) to the example computing device 110 via the example network 108. For example, an entity utilizes the server 102 to transmit developed updates to the computing device 110 periodically, aperiodically, and/or based on a trigger (e.g., when an update is available). The example server 102 may generate the update and/or may obtain the update from another device (e.g., developed by a developer).

The example server 102 includes the example data packet generator 104 of FIG. 1. The data packet generator 104 generates a data packet that is deployed to the computing device to allow the computing device to update the firmware. The data packet generator 104 generates the data packet (e.g., a Boot Script update capsule) to include a header, a payload, and a signature. The header may include an identifier, a firmware version, a BIOS base version, a size, offsets of the payload, and/or a signature. The payload includes Boot Script update data and/or image(s) (e.g., binary images) that correspond to executable code that may be executed by the Boot Script executor 122 to perform one or more tasks. The signature is used to authenticate the entire capsule with any authentication method. The example interface 106 transmits generated Boot Script update capsules to the example computing device 110 via the example network 108 to deploy firmware updates.

The example network 108 of FIG. 1 is a system of interconnected systems exchanging data between the server 102 and computing devices (e.g., including the computing device 110). The example network 108 may be implemented using any type of public or private network such as, but not limited to, the Internet, a telephone network, a local area network (LAN), a cable network, and/or a wireless network. To enable communication via the network 108, the example server 102 and/or the computing device 110 includes a communication interface that enables a connection to an Ethernet, a digital subscriber line (DSL), a telephone line, a coaxial cable, or any wireless connection, etc.

The example computing device 110 of FIG. 1 is a device that implements an operating system. The example computing device 110 may be a server, a virtual machine, a laptop, etc. The example computing device 110 includes an interface 112 (e.g., a network interface controller (NIC)) to obtain Boot Script update capsules (e.g., corresponding to a firmware update) from the server 102 via the network 108 and provide the updates to the computing device 110. The firmware updates can include updates to firmware or firmware components in any component of the computing device 110 that includes firmware (e.g., the example BIOS 119).

The example memory 114 of FIG. 1 is a storage device that stores BIOS code that may be implemented by the BIOS 119 to execute the security (SEC) phase and/or the pre-extendable firmware interface (EFI) initialization (PEI) phase during an S3 state or an enhanced S3 state. Additionally, the example memory 114 stores the example Boot Script update capsules obtained from the server 102 (e.g., via the network 108) until the firmware update is performed during an enhanced S3 protocol. In the example of FIG. 1, the memory 114 is flash memory. However, the memory 114 can be any type or number of memory devices.

The example management agent 116 of FIG. 1 obtains Boot Script update capsules from the server 102 via the example interface 112. The example management agent 116 stores the obtained Boot Script update capsule in the example memory 114. Additionally, the example management agent 116 initiates the firmware update by transmitting an S3 request to the example OS 118 to inform the request the OS 118 to enter into the S3 state. In this manner, the example OS 118 can enter into the S3 state while the BIOS 119 performs the enhanced S3 protocol to update the firmware according to the instructions of the Boot Script update capsule.

The example OS 118 of FIG. 1 is a software system that manages the example processor 117 to manage hardware of the computing device 110, software resources, and/or provides servers for computer programs and/or applications. When the example OS 118 receives an S3 request from the management agent 116, the OS 118 handles the S3 request as a normal S3 event by executing the S3 protocol steps that trigger S3 flow. For example, the OS 118 writes a value corresponding to the S3 state to a sleep state resister (e.g., ACPI SLP_TYP). Accordingly, the example OS 118 handles the S3 event as a normal S3 event (e.g., by performing the steps for the S3 protocol), when the event is actually an enhanced S3 event corresponding to a firmware update (e.g., the OS 118 is unaware that the BIOS 119 is performing or is going to perform the enhanced S3 protocol and/or update firmware). After the example OS 118 writes the value corresponding to the S3 state to the sleep state register, the OS 118 triggers a system management interrupt (SMI). Before an SMI is triggered, the example OS 118 saves the current state and/or configurations of the processor 117 (e.g., the context of the processor 117) in the system management mode (SMM) of the BIOS 119, so that the OS 118 can return to operation when the S3 state is finished (e.g., return to an awake state).

The example BIOS 119 of FIG. 1 is and/or includes firmware. In response to the SMI from the example OS 118, the example BIOS 119 sets a wake up time to a short duration of time (e.g., 10 milliseconds). In this manner, the BIOS 119 can enter into the S3 sleep state for a short duration of time and wake up to update the firmware before triggering the wakeup of the OS 118. After waking up, the BIOS 119 performs the enhanced S3 update resume protocol to resume operation and update firmware. For example, the BIOS 119 performs some of the normal S3 resume protocols, such as a SEC protocol and a PEI protocol to load a newly updated microcode patch, if any. Additionally, during the S3 resume (e.g., the enhanced S3 protocol), the example Boot Script updater 120 accesses the Boot Script update capsule stored in the example memory 114 and parses the capsule to update the Boot Script according to the capsule (e.g., thereby updating the firmware of the BIOS 119) before the Boot Script executor 122 executes the Boot Script. For example, the Boot Script updater 120 can verify that the firmware update is applicable to the BIOS 119 and update the firmware of the BIOS 119 by updating the Boot Script according the data in the capsule. The example Boot Script executor 122 executes the updated Boot Script. After the Boot Script executor 122 executes the Boot Script, the BIOS 119 invokes a wake vector that identifies where the OS 118 left off in a stack. In this manner, the example OS 118 wakes up (e.g., returns to the S0 state), and continues operations where the OS 118 left off (e.g., when the enhanced S3 event was initiated) based on a position of the wake vector. Because the example OS 118 enters the S3 state and memory is not cleared during the S3 state, when the OS 118 is reloaded, the example OS 118 continues operation where it left off based on a wake up vector that corresponds to the position in the stack where the OS 118 left off. A full or warm reboot (as referred to as a cold reboot), on the other hand, completely resets the hardware (e.g., including the memory and/or the stack), reloads the operating system 118, performs computer self-test routine(s) (not performed during a warm boot), and the example OS 118 starts operation at the beginning of the stack because memory is cleared during a full and/or warm reboot, thereby corresponding to longer downtime.

While an example manner of implementing the example computing device 110 and the example server 102 is illustrated in FIG. 1, one or more of the elements, processes and/or devices illustrated in FIG. 1 may be combined, divided, re-arranged, omitted, eliminated, and/or implemented in any other way. Further, the example data packet generator 104, the example interface 106, and/or, more generally, the example server 102 of FIG. 1 and/or the example interface 112, the example memory 114, the example management agent 116, the example processor 117, the example BIOS 119, the example Boot Script updater 120, the example Boot Script executer 122, and/or, more generally, the example computing device 110 of FIG. 1 may be implemented by hardware, software, firmware and/or any combination of hardware, software and/or firmware. Thus, for example, any of the example data packet generator 104, the example interface 106, and/or, more generally, the example server 102 of FIG. 1 and/or the example interface 112, the example memory 114, the example management agent 116, the example processor 117, the example BIOS 119, the example Boot Script updater 120, the example Boot Script executer 122, and/or, more generally, the example computing device 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data packet generator 104, the example interface 106, and/or, more generally, the example server 102 of FIG. 1 and/or the example interface 112, the example memory 114, the example management agent 116, the example processor 117, the example BIOS 119, the example Boot Script updater 120, the example Boot Script executer 122, and/or, more generally, the example computing device 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example server 102 and/or the example computing device 110 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
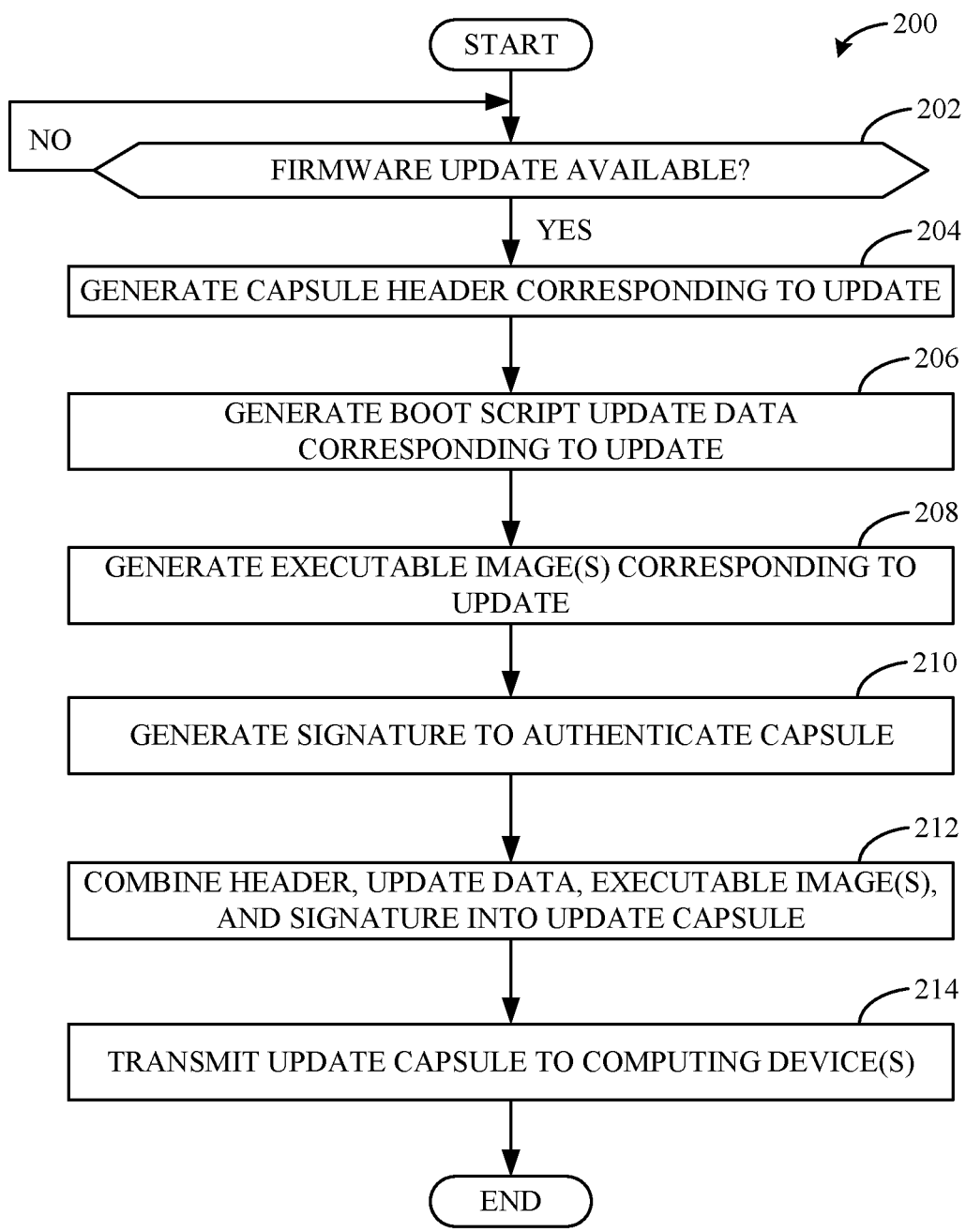
FIG. 2 illustrates a flowchart representative of example machine readable instructions which may be executed to implement the server of FIG. 1 to generate and/or deploy a firmware update using an Boot Script update capsule.
Figure 3:
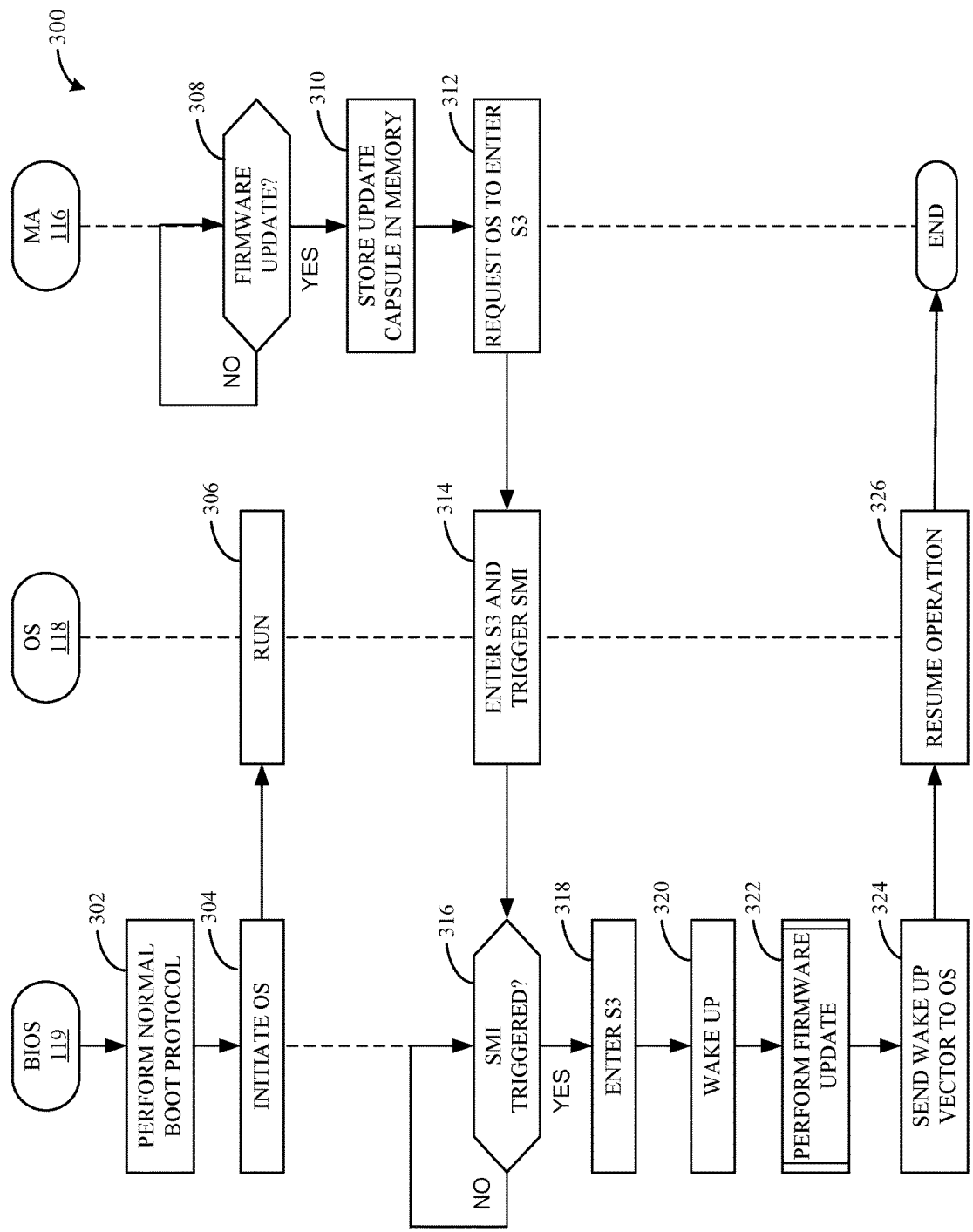
FIGS. 3-4 illustrate flowcharts representative of example machine readable instructions which may be executed to implement the computing device of FIG. 1 to update firmware after receiving a Boot script update capsule.
Figure 4:
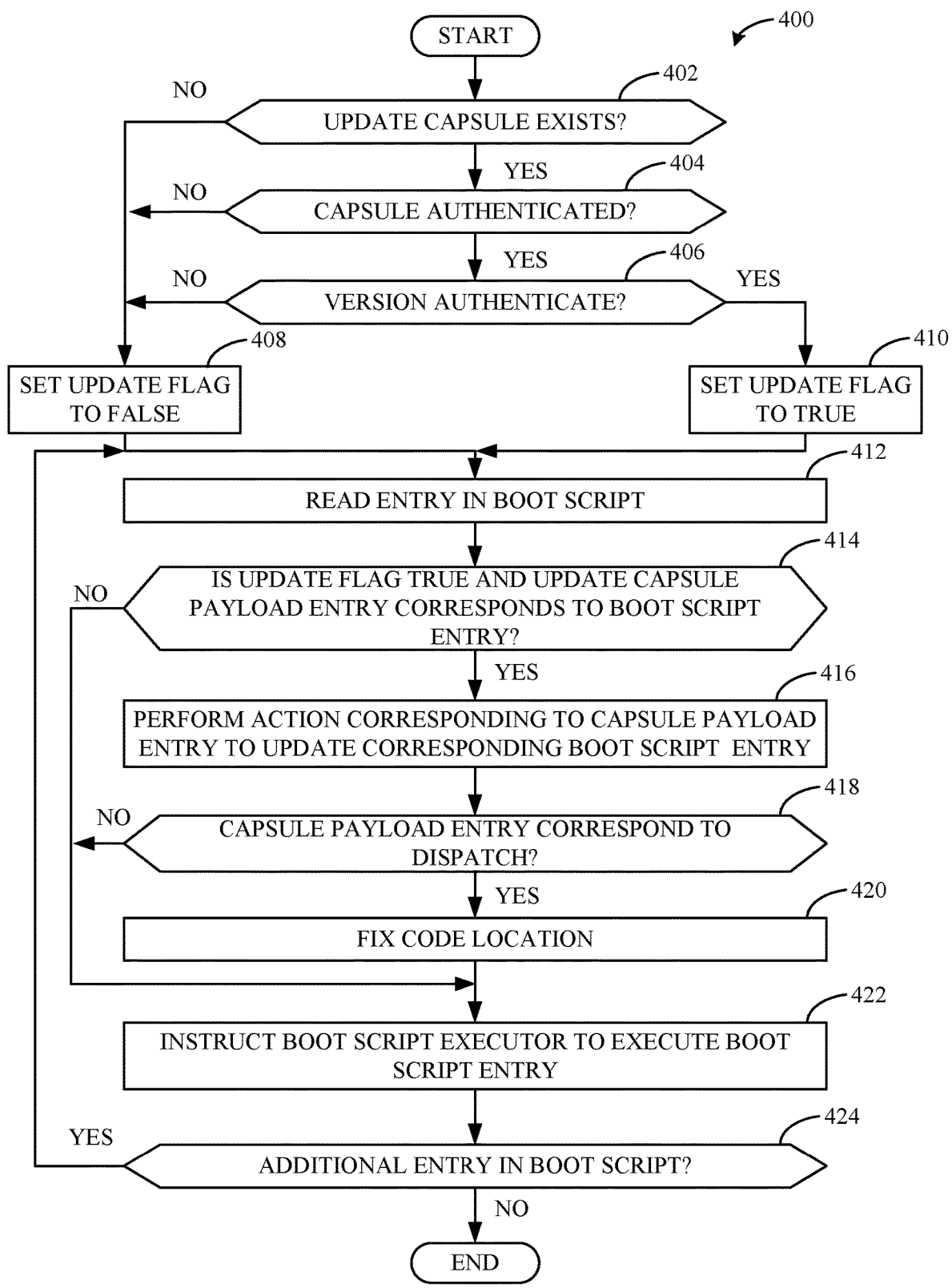

Flowcharts representative of example hardware logic, machine readable instructions, hardware implemented state machines, and/or any combination thereof for implementing the server 102 and/or the example computing device 110 of FIG. 1 are shown in FIGS. 2-4. The machine readable instructions may be one or more executable programs or portion(s) of an executable program for execution by a computer processor such as the processor 712, 812 shown in the example processor platform 700, 800 discussed below in connection with FIGS. 7 and 8. The program may be embodied in software stored on a non-transitory computer readable storage medium such as a CD-ROM, a floppy disk, a hard drive, a DVD, a Blu-ray disk, or a memory associated with the processor 712, 812, but the entire program and/or parts thereof could alternatively be executed by a device other than the processor 712, 812 and/or embodied in firmware or dedicated hardware. Further, although the example program is described with reference to the flowcharts illustrated in FIGS. 2-4 any other methods of implementing the example server 102 and/or the example computing device 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIGS. 2-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 illustrates an example flowchart representative of machine readable instructions 200 that may be executed to implement example server 102 of FIG. 1 to generate an example Boot Script update capsule that is distributed to the computing device 110 to provide firmware updates. Although the instructions 200 are described in conjunction with the example server 102 and/or the example computing device 110 of FIG. 1, the instructions 200 may be described in conjunction with any type of server and/or computing device.

At block 202, the data packet generator 104 determines if a firmware update is available. As described above, the server 102 may generate and/or obtain a firmware update (e.g., generated by a one or more programmers) to update the firmware of the computing device 110 for any number of reasons (e.g., to increase the efficiency of the computing device, to increase the security of the computing device, etc.). The server 102 may inform the data packet generator 104 that a firmware update is ready to be deployed. If the example data packet generator 104 determines that a firmware update is not available (block 202: NO), control returns to block 202 until a firmware update is available.

If the example data packet generator 104 determines that a firmware update is available (block 202: YES), the example data packet generator 104 generates a capsule header corresponding to the update (block 204). As described above, the example data packet generator 104 generates the capsule header to include at least one of an identifier, a firmware version, a BIOS base version, a size, offsets of the payload, and/or a signature. At block 206, the example data packet generator 104 generates the Boot Script update data corresponding to the update. For example, Boot Scrip update data are instructions to change one or more lines of a Boot Script. For example, a Boot Script update may (a) include changing an instruction from writing to a first register to writing to a second register different than the first register, (b) deleting a line in the Boot Script, inserting additional instructions, etc.

At block 208, the example data packet generator 140 generates executable image(s) (e.g., binary image(s)) that correspond to executable code to be executed at the computing device 110 to update firmware. The image includes the executable code and/or a location of the executable code. In this manner, when the computing device 110 obtains the capsule, the computing device 110 can execute the executable code in the image as part of execution of the updated Boot Script, thereby updating the firmware. At block 210, the example data packet generator 140 generates a signature to authenticate the capsule. The example data packet generator 140 may generate a signature based on any type of authenticating protocol so that the computing device 110 can authenticate the capsule as legitimate and/or authentic.

At block 212, the example data packet generator 140 combines the generated header, payload (e.g., the updated data and executable image(s)) and the signature into a Boot Script update capsule. At block 214, the example interface 106 transmits the generated Boot Script update capsule to computing device(s) (e.g., including at least the example computing device 110) via the example network 108. The example interface 106 may transmit the Boot Script update to the computing device 110 when the capsule is ready, at a preset time, and/or based on a request and/or trigger from the computing device 110 and/or an owner of the computing device 110.

FIG. 3 illustrates an example flowchart representative of machine readable instructions 300 that may be executed to implement example computing device 110 of FIG. 1 to perform a firmware update without a warm reboot or a full reboot using an enhanced S3 protocol. Although the instructions 300 are described in conjunction with the example computing device 110 of FIG. 1, the instructions 300 may be described in conjunction with any type of computing device. The example instructions 300 start with the boot up of the example computing device 110.

At block 302, the example BIOS 119 (FIG. 1) performs a normal Boot protocol to boot up the example computing device 110. For example, the BIOS 119 performs hardware initialization so that the OS 118 can operate. At block 304, the example BIOS 119 initiates the OS 118 to run (block 306). At block 308, the example management agent 116 determines if a firmware update (e.g., a Boot Script update capsule) has been obtained (e.g., via the interface 112). If the example management agent 116 determines that a firmware update has not been received/obtained (block 308: NO), control returns to block 208 until a firmware update is obtained. If the example management agent 116 determines that a firmware update has been received/obtained (block 308: YES), the example management agent 116 causes the update to be stored in the example memory 114 (block 310). For example, the management agent 116 may cause the update to be stored in the flash (e.g., the example memory 114) indirectly through a $3^{rd}$ party on-board component (e.g., a complex programmable logic device (CPLD))

At block 312, the example management agent 116 sends a request to the OS 118 to enter into the S3 state. At block 314, the example OS 118 enters the S3 state by executing a protocol and triggers a system management interrupt to identify the S3 sleep state to the BIOS 119. As described above, the OS 118 enters the S3 state, while the BIOS 119 enters into an enhanced S3 state. At block 316, the example BIOS 119 determines if an SMI has been triggered. If the example BIOS 119 determines that an SMI has not been triggered (block 316: NO), control returns to block 316 until the BIOS 119 determines that the OS 118 triggered an SMI. The BIOS 119 may determine that the event corresponds to a firmware updated (e.g., an enhanced S3 event) rather than a regular S3 event by (a) checking if there is a valid update capsule stored in the example memory 114 and/or (b) checking a flag, variable, register, etc. set by and/or managed by another device (e.g., the example management agent 116) to indicate that a valid capsule is stored locally, etc. At block 318, the example BIOS 119 enters S3. As described above, because the BIOS 119 is performing an enhanced S3 event to update firmware, instead of a normal S3 protocol, the example BIOS 119 enters into the S3 sleep state for a short duration of time (e.g., as short of a duration as is capable for the BIOS 119) and the BIOS 119 performs the firmware update before waking up the OS 118.

At block 320, the example BIOS 119 wakes up. After waking up, the example BIOS 119 can perform different protocols associated with the S3 wake up protocol (e.g., a normal SEC, a PEI with the updated firmware, etc.). At block 322, the example BIOS 119 performs the rest of the enhanced S3 protocol including performing the firmware update. An example of the firmware update protocol is further described below in conjunction with FIG. 4. At block 324, the example BIOS 119 sends a wake up vector to the OS 118. As described above, a wake up allows the OS 118 to continue operations from where the OS 118 left off before the S3 event. Thus, the OS 118 can continue operation without a full reset/reboot. At block 326, the example OS 118 resumes operation (e.g., using the wake up vector to continue operation where the OS 118 left off), with the Boot Script being updated corresponding to the firmware being updated.

FIG. 4 illustrates an example flowchart representative of machine readable instructions 322 (corresponding to block 322 of FIG. 3) that may be executed to implement example computing device 110 of FIG. 1 to perform the firmware update, as described above in conjunction with block 322 of FIG. 3. Although the instructions 322 are described in conjunction with the example computing device 110 of FIG. 1, the instructions 322 may be described in conjunction with any type of computing device.

At block 402, the example Boot Script updater 120 determines if a Boot Script update capsule exists. For example, the Boot Script updater 120 checks the memory 114 to see if a Boot Script update capsule has been stored in the example memory 114. If the example Boot Script updater 120 determines that the Boot Script update capsule does not exist (e.g., is not stored in the memory 114) (block 402: NO), control continues to block 408. If the example Boot Script updater 120 determines that the Boot Script update capsule does exist (e.g., is stored in the memory 114) (block 402: YES), the example Boot Script updater 120 determines if the capsule is authenticated (block 404). For example, the Boot Script updater 120 can use the signature of the capsule to authenticate the capsule. If the example Boot Script updater 120 cannot authenticate the capsule (block 404: NO), control continues to block 408.

If the example Boot Script updater 120 can authenticate the capsule (block 404: YES), the example Boot Script updater 120 determines if the firmware version of the capsule is authentic or relevant to the computing device 110 (block 406). For example, the server 102 may not be aware of the characteristics of the computing device 110 (e.g., the version or type of the BIOS and/or OS being implemented by the computing device 110). Accordingly, the example Boot Script updater 120 can verify and/or authenticate that the Boot Script update corresponds to the computing device 110 by processing the header to determine if the information in the header corresponds to an update for the computing device 110 (e.g., corresponds to the computing device type/version, the BIOS type/version, etc.).

If the example Boot Script updater 120 determines that the version is not authentic or relevant (block 406: NO), the example Boot Script updater 120 sets an update flag to a first value corresponding to false (block 408). In this manner, if the flag is set to a first value (e.g., false or '0'), the firmware will not be updated and if the flag is set to a second value (e.g., true or '1'), the firmware will be updated. The flag may be a value or variable stored in a register and/or memory. If the example Boot Script updater 120 determines that the version is authentic or relevant (block 406: YES), the example Boot Script updater 120 sets the update flag to true (block 410).

At block 412, the example Boot Script updater 120 reads a first entry in the Boot Script (e.g., the Boot Script that is currently implemented by the BIOS 119). At block 416, the example Boot Script updater 120 determines if the update flag is set to true and there is an entry in the payload of the update capsule that corresponds to the entry in the Boot Script. For example, the capsule payload includes entries with target locations and instructions. The example Boot Script updater 120 determines if there is an update in the capsule with for a target location that corresponds to the location of the current entry in the Boot Script. An example is further described below in conjunction with FIG. 6. If the example Boot Script updater 120 determines that the update flag is not true (e.g., is false) or the update Boot Scrip does not correspond to the entry (block 414: NO), control continues to block 422.

If the example Boot Script updater 120 determines that the update flag is true and the update Boot Scrip corresponds to the entry (block 414: YES), the example Boot Script updater 120 performs the action corresponding to the capsule payload entry to update the corresponding Boot Scrip entry (e.g., the Boot Script entry read at block 412) (block 416). For example, if the Boot Script entry corresponds to a write to a first particular location in memory and the Boot Script update for the corresponding Boot Scrip entry corresponds to a second different location in the memory, the example Boot Script updater 120 changes the original Boot Scrip entry to replace the first particular location in memory to the second different location in memory.

At block 418, the example Boot Script updater 120 determines if the Boot Script update capsule payload entry corresponds to a dispatch. A dispatch occurs when the Boot Script update capsule includes executable code to be executed embedded in an encoded image (e.g., a binary image). As described above, the Boot Script update capsule may include images with executable code to be executed by the BIOS 119. Accordingly, when an image is included in the payload of the update capsule, the example Boot Script updater 120 has to determine if the update corresponds to an image with executable code that needs to be dispatched (e.g., stored in local memory to be executed by the BIOS 119). If the example Boot Script updater 120 determines that the Boot Script update capsule payload entry does not correspond to a dispatch (e.g., an image) (block 418: NO), control continues to block 422. If the example Boot Script updater 120 determines that the Boot Script update capsule payload entry corresponds to a dispatch (e.g., an image) (block 418: YES), the example Boot Script updater 120 fixes the code location by extracting the executable code of the image in the payload and storing the executable code in the image locally in the BIOS 119 (block 420). An example of fixing a code location is further described below in conjunction with FIG. 6.

At block 422, the example Boot Script updater 120 instructs the Boot Script executor 122 to execute the updated Boot Script entry. In this manner, after the firmware has been updated (e.g., by updating the Boot Script entry based on the corresponding Boot Script update entry), the Boot Script executer 122 executes the updated Boot Script entry to finalize the firmware update for the entry. At block 424, the example Boot Script updater 120 determines if there is an additional entry in the Boot Script to process. If the example Boot Script updater 120 determines that there is an additional entry in the Boot Script to process (block 424: YES), control returns to block 412 to process the additional entry to determine if the additional entry is to be updated.

Figure 5:
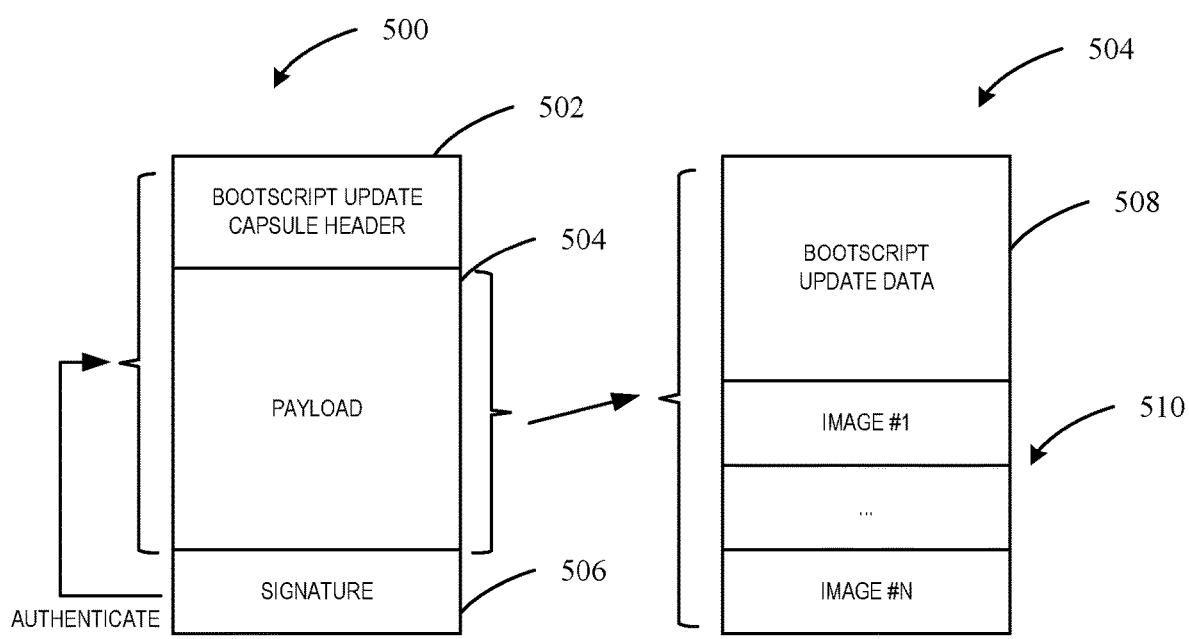
FIG. 5 illustrates an example Boot Script update capsule that the server of FIG. 1 may generate and deploy to the computing device of FIG. 1.

FIG. 5 illustrates an example Boot Script update capsule 500 that the server 102 may generate. The example Boot Script update capsule 500 includes an example header 502, an example payload 504, and an example signature 506. The example payload 504 includes an example Boot Script update data 508 and example executable images 510.

As described above, the example Boot Script update capsule header 502 of FIG. 5 may include an identifier, a firmware version, a BIOS base version, a size, offsets of the payload, and/or a signature. The example computing device 110 can use the information in the header 502 to determine if the firmware update is relevant to the computing device 110. An example format of the Boot Script update capsule header 502 is illustrated below in Table 1. However, the Boot Script update capsule header 502 may include any type of format (e.g., with less entries, additional entries, different entries, different offsets, and/or different lengths).

TABLE 1

Reference Format of Boot Script Update Capsule Header

| Field | Offset (Bytes) | Length (Bytes) | Description |
|---|---|---|---|
| Magic | 0 | 4 | 0xaabbccdd to identify the Boot Script update capsule. |
| Size | 4 | 4 | Total Capsule Size including header |
| Capsule Revision | 4 | 1 | revision number |
| BIOS revision | 5 | 4 | Specify which BIOS version to apply |
| Signature offset | 9 | 4 | Offset of the signature over the whole Capsule (exclude signature region) |
| Signature length | 13 | 2 | length of the signature |
| Update Data Offset | 15 | 4 | Offset of Update Data region |
| Update Data Size | 19 | 4 | Size of Update Data region |
| Image number | 23 | 2 | Number of images included in the capsule |
| Image Offset[1] | 25 | 4 | Offset of first image |
| Image Offset[2 ... N] | Image Offset[1 ... N − 1] + 4 | 4 | Offset of the rest images |

The example payload 504 of FIG. 5 includes Boot Script update data 508 which updates particular entries of a currently implemented Boot Script on the computing device 110. An example format of the Boot Script update data 508 is illustrated below in Table 2. However, the Boot Script update data 508 may include any type of format (e.g., with less entries, additional entries, different entries, different offsets, and/or different lengths).

Figure 6:
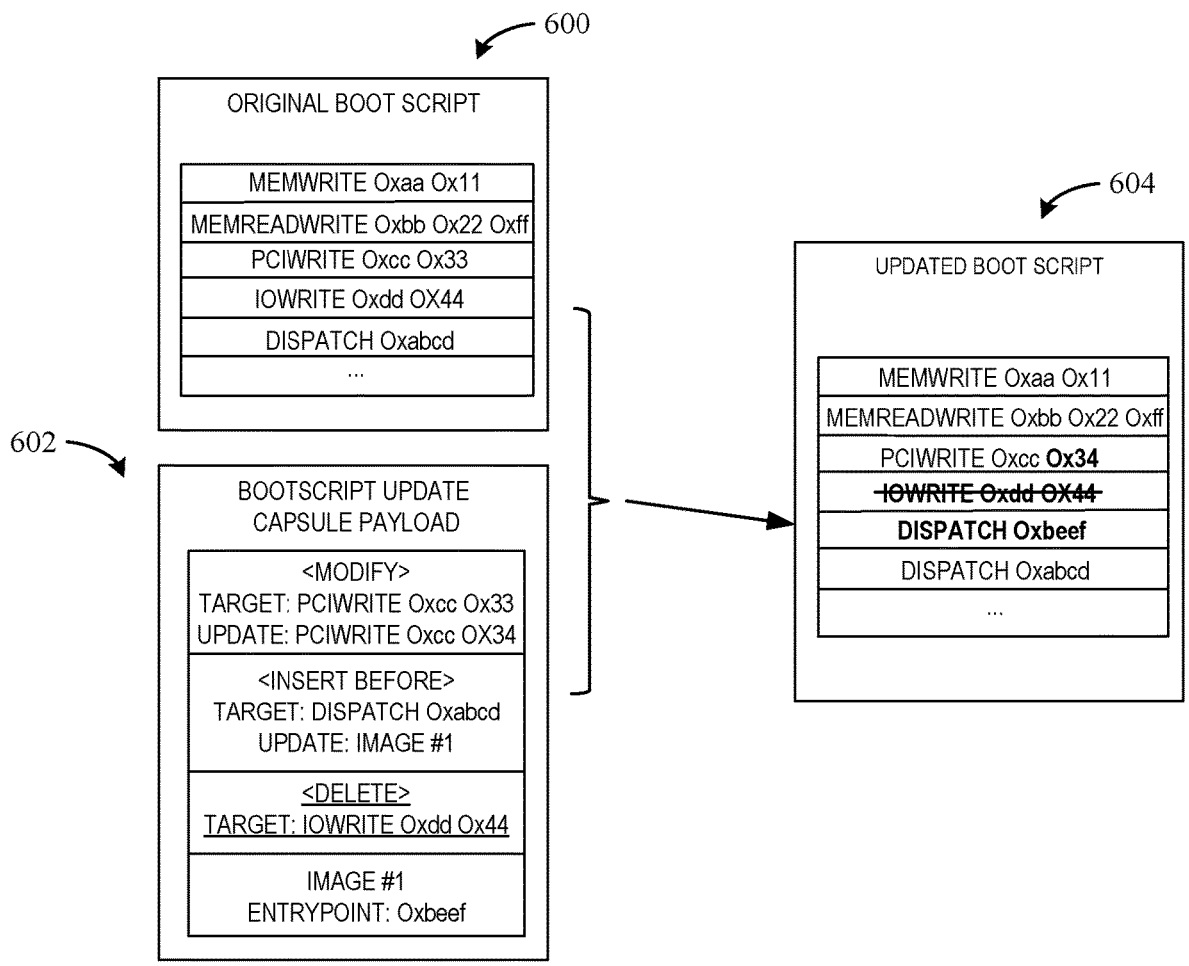
FIG. 6 illustrates an example Boot Script that is updated based on a Boot Script update capsule.

The original Boot Script 600 of FIG. 6 includes different entries that correspond to different instructions of the Boot Script that is implemented by the BIOS 119 before a firmware and/or Boot Script update occurs. The example Boot Script 600 includes an entry for a memory write, a memory read and write, a peripheral component interconnect (PCI) write, an input/output (IO) write and a dispatch (e.g., execute code stored locally).

TABLE 2

Reference Format of Boot Script Update Data

| Field | Offset | Length (Bytes) | Value/Comment |
|---|---|---|---|
| Entry type | 0 | 1 | 0x01: Insert Before<br>0x02: Insert After<br>0x03: Modify<br>0x04: Delete |
| Entry Size | 1 | 2 | Entry size |
| Target entry size | 3 | 1 | size of EFI_BOOT_SCRIPT_xxx |
| Target entry | 4 | Target entry size | EFI_BOOT_SCRIPT_xxx |
| Update Entry number | 4 + Target entry size | 2 | number of the update entry |
| Update Entry[1] | 6 + Target entry size | Update Entry[1] size | EFI_BOOT_SCRIPT_xxx |
| Update Entry[2 ... N] | 6 + Update Entry[1 ... N −1] size | Update Entry[2 ... N] size | EFI_BOOT_SCRIPT_xxx |

The payload 504 of FIG. 1 further includes images 510. As described above, the images include executable code that the BIOS 119 of the computing device 110 can store locally and execute as part of the firmware update process. In some examples, the image format could be a portable executable (PE) and/or a common object file format (COFF). The example payload 504 further includes the example signature 506 that may be used by the computing device 110 to authenticate the whole capsule 500 with any authentication method.

FIG. 6 illustrates an example original Boot Script 600 implemented by the example BIOS 119, an example Boot Script update capsule payload 602 that the computing device 110 obtains from the server 102, and an example update Boot Script 604 that reflects the updated firmware/Boot Script after the example Boot Script updater 120 modifies the original Boot Script 600 based on the capsule payload 602.

The example Boot Script update capsule payload 602 of FIG. 6 is the capsule generated by the example server 102 and transmitted to the example computing device 110. The example Boot Script update capsule payload 602 includes three entries and one image. Although, the capsule payload can include any number of entries and/or images. The first entry of the example Boot Script update capsule payload 602 is a modify entry that modifies the Boot Script entry corresponding to the PCI write to a PCI write at a different location (e.g., 0x34 instead of 0x33). Accordingly, the Boot Script update entry targets the PCI write entry of the original Boot Script 600 and includes the instructions for the update to the different location. Accordingly, the example Original Boot Script entry corresponding to the PCI write is updated in the updated Boot Script 604.

The example Boot Script update capsule payload 602 of FIG. 2 further includes an insert before update entry that corresponds to inserting a new entry into the original Boot Script 600 before a target entry (e.g., the dispatch entry of the original Boot Script 600). The insert entry of the update capsule 602 corresponds to an image (e.g., Image #1). Accordingly, the image (e.g., image #1) is also included in the Boot Script update capsule payload 602. The image includes executable code to be executed by the BIOS 119 with a location (e.g., entry point) of where the corresponding executable code of the image should be stored. In this manner, the example BIOS 119 updates the original Boot Script 600 to include a dispatch command to execute the code corresponding to the image at the identified location.

The example Boot Script update capsule payload 602 of FIG. 2 further includes a delete update entry that corresponds to deleting an entry of the original Boot Script 600 identified by the target (e.g., corresponding to the location of the entry of the original Boot Script 600). In this manner, the example Boot Script updater 120 deletes the corresponding entry from the original Boot script 600, as shown in the example updated Boot Script 604.

Figure 7:
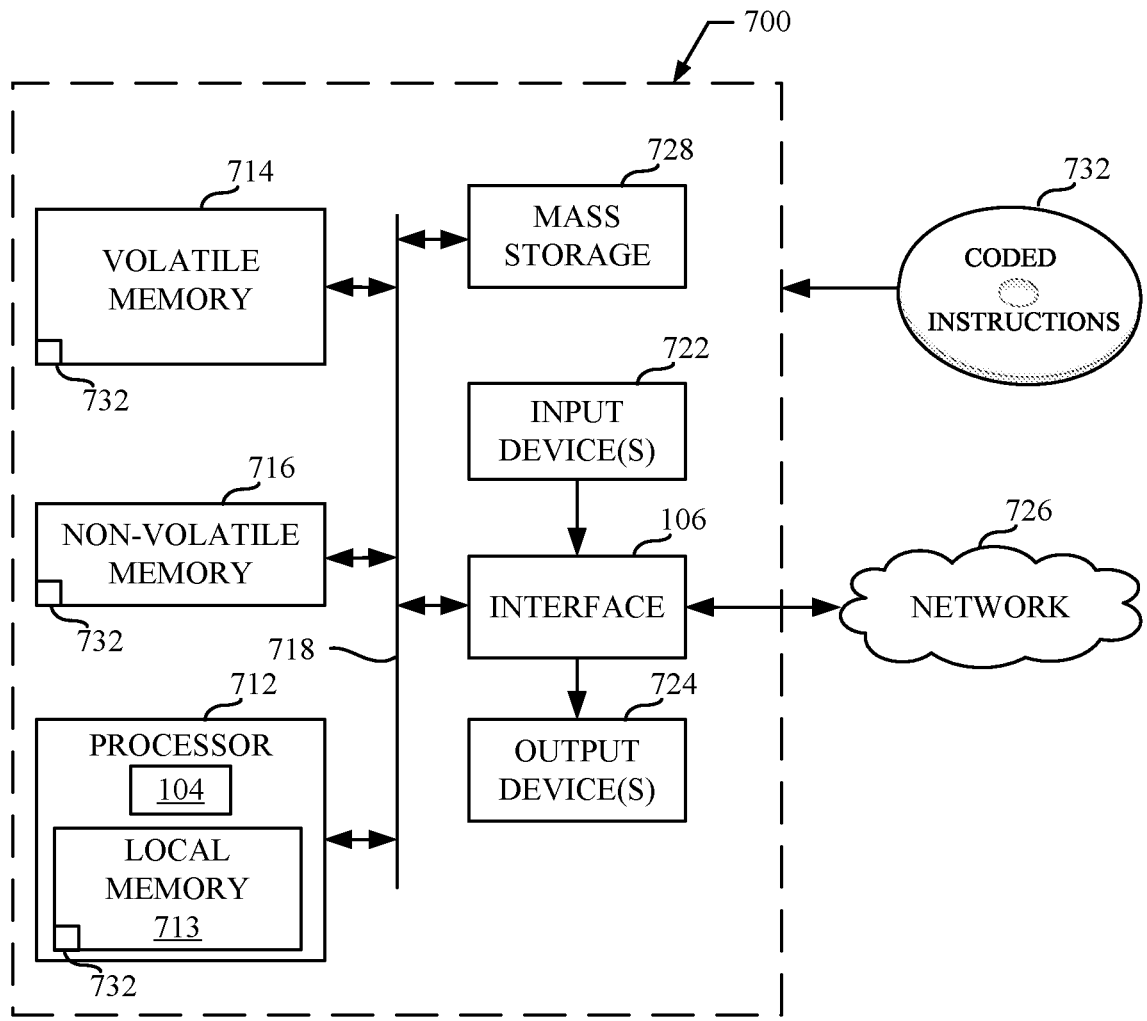
FIG. 7 is a block diagram of an example processing platform structured to execute the instructions of FIG. 2 to implement the example server of FIG. 1.

FIG. 7 is a block diagram of an example processor platform 700 structured to execute the instructions of FIG. 2 to implement the server 102 of FIG. 1. The processor platform 700 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the data packet generator 104 of FIG. 1.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller. The example local memory 713, the example volatile memory 714, and/or the example non-volatile memory 716 may implement the example memory 114 of FIG. 1.

The processor platform 700 of the illustrated example also includes an interface circuit 106. The interface circuit 106 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 106. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 106 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 106 of the illustrated example, thus, typically includes a graphics driver card, a graphics driver chip, and/or a graphics driver processor.

The interface circuit 106 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 2 may be stored in the mass storage device 728, in the volatile memory 714, in the non-volatile memory 716, and/or on a removable non-transitory computer readable storage medium such as a CD or DVD.

Figure 8:
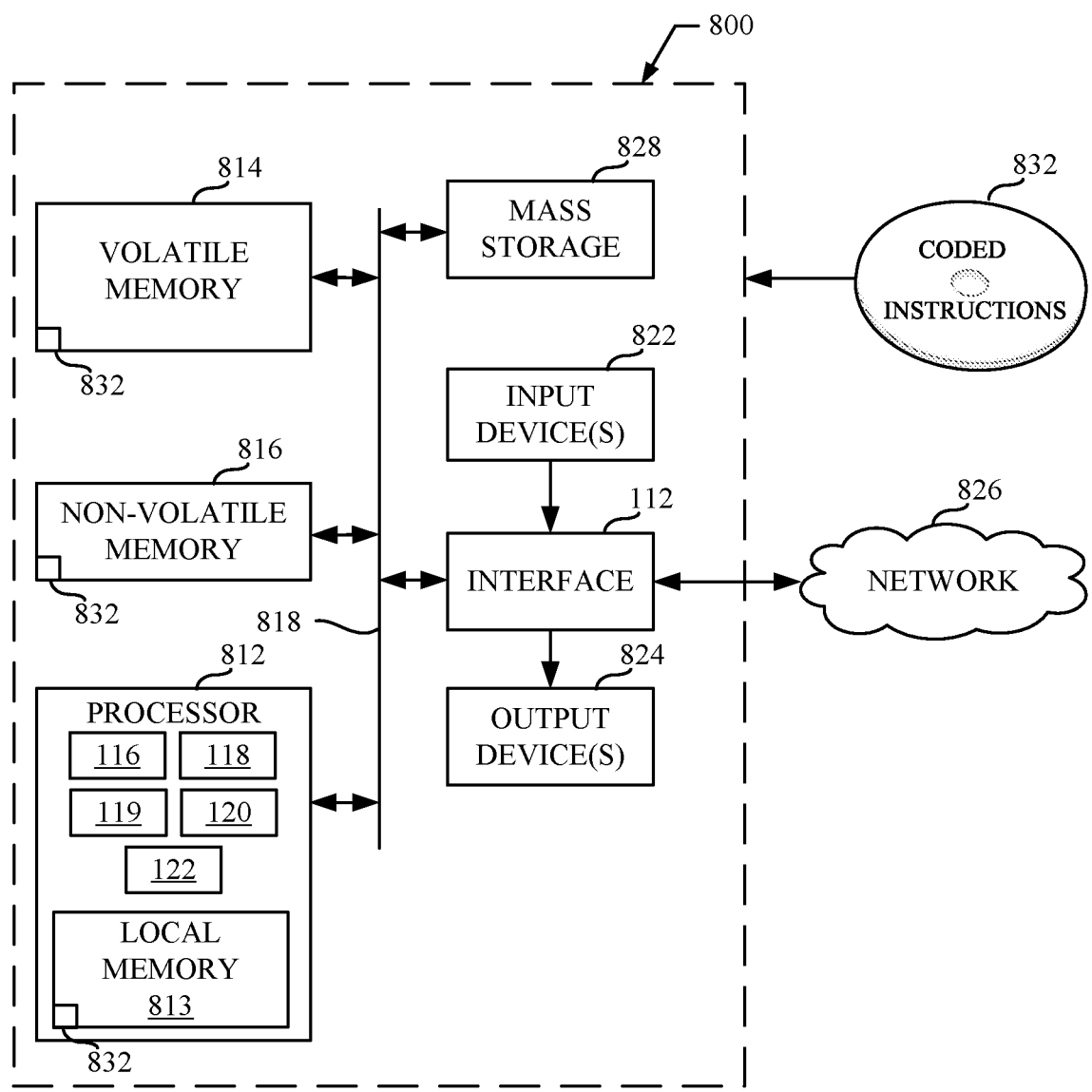
FIG. 8 is a block diagram of an example processing platform structured to execute the instructions of FIGS. 3-4 to implement the example computing device of FIG. 1.

FIG. 8 is a block diagram of an example processor platform 800 structured to execute the instructions of FIGS. 3-4 to implement the computing device 110 of FIG. 1. The processor platform 800 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 800 of the illustrated example includes a processor 812 (e.g., which may implement the processor 117 of FIG. 1). The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example management agent 116, the example OS 118, the example BIOS 119, the example Boot Script updater 120, and the example Boot Script executor 122 of FIG. 1.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller. The example local memory 813, the example volatile memory 814, and/or the example non-volatile memory 816 may implement the example memory 114 of FIG. 1.

The processor platform 800 of the illustrated example also includes an interface circuit 112. The interface circuit 112 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 112. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 112 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 112 of the illustrated example, thus, typically includes a graphics driver card, a graphics driver chip, and/or a graphics driver processor.

The interface circuit 112 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3-4 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed to perform an enhanced S3 protocol to update firmware with a Boot Script update. Example methods, apparatus and articles of manufacture reduce the amount of downtime of a computing device when firmware is to be updated by allowing the OS to perform S3 flow while the computing device updates firmware using an enhanced S3 flow. In this manner, firmware can be updated without a full reboot or a warm reboot with minimal downtime. Accordingly, example methods, apparatus and articles of manufacture disclosed herein are directed to one or more improvement(s) in the functioning of a computing system.

Example methods, apparatus, systems, and articles of manufacture to perform an enhanced S3 protocol to update firmware with a Boot Script update are disclosed herein. Further examples and combinations thereof include the following: Example 1 includes an apparatus to update firmware during a sleep state, the apparatus comprising a management agent to store a firmware update into memory, and request an operating system (OS) to enter into an S3 sleep state, the request to cause the OS to trigger an interrupt, and a basic input/output system (BIOS) to, in response to the interrupt from the OS update a Boot Script according to the firmware update, the Boot Script executed by the BIOS to operate the BIOS, and wake up the OS with a wake vector.

Example 2 includes the apparatus of example 1, wherein the BIOS is to process the firmware update to determine that the update is at least one of authentic or relevant to the BIOS.

Example 3 includes the apparatus of example 1, wherein the firmware update includes instructions to update a previous Boot Script implemented by the BIOS.

Example 4 includes the apparatus of example 3, wherein the BIOS is to execute the instructions to update the firmware of the BIOS.

Example 5 includes the apparatus of example 1, wherein the BIOS is to extract code from a binary image included in a firmware update capsule.

Example 6 includes the apparatus of example 5, wherein the BIOS is to execute the extracted code to update the Boot Script.

Example 7 includes the apparatus of any one of examples 1-5, wherein the BIOS includes a Boot Script updater to update the Boot Script according to the firmware update, and a Boot Script executor to execute the updated Boot Script.

Example 8 includes the apparatus any one of examples 1-5, wherein the firmware update includes at least one of instructions to update a Boot Script previously implemented by the BIOS or executable code to be executed by the BIOS.

Example 9 includes an apparatus for generating a firmware update capsule, the apparatus comprising a packet generator to generate a header with information corresponding to a firmware update, the firmware update including instructions to update a Boot Script implemented by a basic input/output system (BIOS) on a computing device, generate a Boot Script update to change the Boot Script implemented by the BIOS on the computing device, the Boot Script corresponding to operation of the BIOS, the BIOS implemented by firmware, generate a binary image including executable code corresponding to the instructions to be implemented by the BIOS when executing the updated Boot Script, and combine the header, the Boot Script update, and the image in a firmware update capsule, and an interface to transmit the firmware update capsule to a computing device.

Example 10 includes the apparatus of example 9, wherein the packet generator is to generate a signature and include the signature in the firmware update capsule.

Example 11 includes the apparatus of example 10, wherein the signature authenticates the firmware update capsule.

Example 12 includes the apparatus of any one of examples 10-11, wherein the header includes at least one of an identifier, a firmware version, a BIOS base version, a size, offsets of a payload, and/or the signature.

Example 13 includes a non-transitory computer readable storage medium comprising instructions which, when executed, cause one or more devices to at least store a firmware update into memory, and request an operating system (OS) to enter into an S3 sleep state, in response to an interrupt from the OS update a Boot Script according to the firmware update, the Boot Script executed by a basic input/output system (BIOS) to operate the BIOS, and wake up the OS with a wake vector.

Example 14 includes the computer readable storage medium of example 13, wherein the instructions cause the one or more devices to process the firmware update to determine that the update is at least one of authentic or relevant to the one or more devices.

Example 15 includes the computer readable storage medium of example 13, wherein the firmware update includes instructions to update a previous Boot Script implemented by the one or more devices.

Example 16 includes the computer readable storage medium of example 15, wherein the instructions cause the one or more devices to execute the instructions to update the firmware of the one or more devices.

Example 17 includes the computer readable storage medium of any one of examples 13-16, wherein the instructions cause the one or more devices to extract code from an image of the firmware update.

Example 18 includes the computer readable storage medium of example 17, wherein the instructions cause the one or more devices to execute the extracted code.

Example 19 includes the computer readable storage medium of any one of examples 13-16, wherein the firmware update includes at least one of instructions to update a Boot Script previously implemented by the BIOS or executable code to be executed by the BIOS.

Example 20 includes a non-transitory computer readable storage medium comprising instructions which, when executed, cause one or more processors to at least generate a header with information corresponding to a firmware update, the firmware update including instructions to update a Boot Script implemented by a basic input/output system (BIOS) on a computing device, generate a Boot Script update to change the Boot Script implemented by the BIOS on the computing device, the Boot Script corresponding to operation of the BIOS, the BIOS implemented by firmware, generate a binary image including executable code corresponding to the instructions to be implemented by the BIOS when executing the updated Boot Script, and combine the header, the Boot Script update, and the image in a firmware update capsule, and instruct an interface to transmit the firmware update capsule to a computing device.

Example 21 includes the computer readable storage medium of example 20, wherein the instructions cause the one or more processors to generate a signature and include the signature in the firmware update capsule.

Example 22 includes the computer readable storage medium of example 21, wherein the signature authenticates the firmware update capsule.

Example 23 includes the computer readable storage medium of any one of examples 20-22, wherein the header includes at least one of an identifier, a firmware version, a BIOS base version, a size, offsets of a payload, and/or the signature.

Example 24 includes a method to update firmware during a sleep state, the method comprising storing a firmware update into memory, requesting an operating system (OS) to enter into an S3 sleep state, and in response to an interrupt from the OS updating a Boot Script according to the firmware update, the Boot Script executed by a basic input/output system (BIOS) to operate the BIOS, and waking up the OS with a wake vector.

Example 25 includes the method of example 24, further including process the firmware update to determine that the update is at least one of authentic or relevant to the BIOS.

Example 26 includes the method of example 24, wherein the firmware update includes instructions to update a previous Boot Script implemented by the BIOS.

Example 27 includes the method of example 26, further including executing the instructions to update the firmware of the one or more devices.

Example 28 includes the method of any one of examples 24-27, further including extracting code from an image of the firmware update.

Example 29 includes the method of example 38, further including execute the extracted code.

Example 30 includes the method of any one of examples 24-27, wherein the firmware update includes at least one of instructions to update a Boot Script previously implemented by the BIOS or executable code to be executed by the BIOS.

Example 31 includes a method to update firmware, the method generating a header with information corresponding to a firmware update, the firmware update including instructions to update a Boot Script implemented by a basic input/output system (BIOS) on a computing device, generating a Boot Script update to change the Boot Script implemented by the BIOS on the computing device, the Boot Script corresponding to operation of the BIOS, the BIOS implemented by firmware, generating a binary image including executable code corresponding to the instructions to be implemented by the BIOS when executing the updated Boot Script, and combining the header, the Boot Script update, and the image in a firmware update capsule, and instructing an interface to transmit the firmware update capsule to a computing device.

Example 32 includes the method of example 31, further including generating a signature and include the signature in the firmware update capsule.

Example 33 includes the method of example 32, wherein the signature authenticates the firmware update capsule.

Example 34 includes the method of any one of examples 31-32, wherein the header includes at least one of an identifier, a firmware version, a BIOS base version, a size, offsets of a payload, and/or the signature.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to update firmware during a sleep state, the apparatus comprising:
   instructions;
   at least one processor circuit to be programmed by the instructions to:
      cause storage of a firmware update into memory; and
      request an operating system (OS) to enter into an S3 sleep state, the request to cause the OS to trigger an interrupt; and
   a basic input/output system (BIOS) to:
      enter into an S3 sleep state based on the interrupt;
      wake up after a preset amount of time after the OS triggers the interrupt;
      while the OS is in the S3 sleep state, update a Boot Script according to the firmware update, the Boot Script to be executed by the BIOS to operate the BIOS; and
      wake up the OS with a wake vector.

2. The apparatus of claim 1, wherein the BIOS is to process the firmware update to determine that the update is at least one of authentic or relevant to the BIOS.

3. The apparatus of claim 1, wherein the instructions are first instructions, and the firmware update includes second instructions to update a previous Boot Script implemented by the BIOS.

4. The apparatus of claim 3, wherein the BIOS is to execute the second instructions to update the previous Boot Script implemented by the BIOS.

5. The apparatus of claim 1, wherein the BIOS is to extract code from a binary image included in a firmware update capsule.

6. The apparatus of claim 5, wherein the BIOS is to execute the extracted code to update the Boot Script.

7. The apparatus of claim 1, wherein the BIOS includes:
  Boot Script update instructions to update the Boot Script according to the firmware update; and
  Boot Script execution instructions to cause execution of the updated Boot Script.

8. The apparatus of claim 1, wherein the instructions are first instructions, and the firmware update includes at least one of second instructions to update a Boot Script previously implemented by the BIOS or executable code to be executed by the BIOS.

9. A non-transitory computer readable storage medium comprising instructions to cause at least one processor circuit to at least:
  cause storage of a firmware update into memory;
  request an operating system (OS) and a basic input/output system (BIOS) to enter into an S3 sleep state;
  wake up the BIOS after a preset amount of time after the OS triggers an interrupt;
  while the OS is in the S3 sleep state, update a Boot Script according to the firmware update, the Boot Script executed by the BIOS; and
  wake up the OS with a wake vector.

10. The computer readable storage medium of claim 9, wherein the instructions cause one or more of the at least one processor circuit to process the firmware update to determine that the update is at least one of authentic or relevant.

11. The computer readable storage medium of claim 9, wherein the firmware update includes second instructions to update a previous Boot Script.

12. The computer readable storage medium of claim 11, wherein the instructions cause one or more of the at least one processor circuit to update the previous Boot Script.

13. The computer readable storage medium of claim 9, wherein the instructions cause one or more of the at least one processor circuit to extract code from an image of the firmware update.

14. The computer readable storage medium of claim 13, wherein the instructions cause one or more of the at least one processor circuit to execute the extracted code.

15. The computer readable storage medium of claim 9, wherein the firmware update includes at least one of second instructions to update a Boot Script previously implemented by the BIOS or executable code to be executed by the BIOS.

16. A method to update firmware during a sleep state, the method comprising:
  storing a firmware update into memory;
  requesting an operating system (OS) and a basic input/output system (BIOS) to enter into an S3 sleep state;
  waking up the BIOS after a preset amount of time after the OS triggers an interrupt;
  while the OS is in the S3 sleep state, updating a Boot Script according to the firmware update, the Boot Script executed by the BIOS; and
  waking up the OS with a wake vector.

17. The method of claim 16, including determining that the update is at least one of authentic or relevant to the BIOS.

18. The method of claim 16, including updating a previous Boot Script implemented by the BIOS.

19. The method of claim 18, including executing instructions to update firmware.

20. The method of claim 16, including:
  extracting code from an image of the firmware update; and
  executing the extracted code.

* * * * *